(12) United States Patent
Marchand

(10) Patent No.: US 6,236,761 B1
(45) Date of Patent: May 22, 2001

(54) METHOD AND APPARATUS FOR HIGH SPEED HAAR TRANSFORMS

(75) Inventor: J. F. Philippe Marchand, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/127,039

(22) Filed: Jul. 31, 1998

(51) Int. Cl.⁷ ........................................................ G06K 9/36
(52) U.S. Cl. ............................................ 382/248; 382/281
(58) Field of Search .................................... 382/240, 248, 382/263–265, 281, 303, 276; 364/724.05, 724.17, 725.01, 725.02, 726.07, 727.01; 708/5, 400, 403

(56) References Cited

U.S. PATENT DOCUMENTS 3,981,443 * 9/1976 Lynch et al. .......................... 708/401

OTHER PUBLICATIONS

"Embedded Image Coding Using Zerotrees of Wavelet Coefficients", Jerome M. Shapiro, *IEEE Transactions On Signal Processing*, vol. 41, No. 12, pp. 3445–3462, Dec. 1993.

"Image Coding Using Wavelet Transform", Marc Antonini, et al, *IEEE Transactions On Signal Processing*, vol. 1, No. 2, pp. 205–220, Apr. 1992.

"Wavelet Transforms in a JPEG–Like Image Coder", R. de Queiroz, et al. *SPIE*, pp. 1662–1673, vol. 2308.

"Predictor Optimization", *Digital Image Compression Techniques*, M. Rabbani, P.W. Jones, Chapter 9, pp. 81–83, SPIE Press 1991.

* cited by examiner

*Primary Examiner*—Yon J. Couso
(74) *Attorney, Agent, or Firm*—Oliff & Berridge, PLC

(57) ABSTRACT

This invention provides a method and apparatus for performing Haar transforms that process one image pixel for each clock cycle. The Haar transform is performed by cascading successive Haar transform cells where each Haar transform cell processes a 2×2 block of inputs and outputs a 2×2 block of Haar transform coefficients. Four inputs are processed by a first stage of two adders and two subtractors to generate four Haar transform coefficients. The output of the Haar transform may be quantized, run length encoded and then compressed to achieve a high compression ratio of greater than 20 to 1 for near lossless image compression.

14 Claims, 14 Drawing Sheets

|   | 1 | 2 | 3 | 4 | 5 | 6 | 7 | 8 |
|---|---|---|---|---|---|---|---|---|
| 1 | $A_1$ | $A_2$ | $A_5$ | $A_6$ | $B_1$ | $B_2$ | $B_5$ | $B_6$ |
| 2 | $A_3$ | $A_4$ | $A_7$ | $A_8$ | $B_3$ | $B_4$ | $B_7$ | $B_8$ |
| 3 | $A_9$ | $A_{10}$ | $A_{13}$ | $A_{14}$ | $B_9$ | $B_{10}$ | $B_{13}$ | $B_{14}$ |
| 4 | $A_{11}$ | $A_{12}$ | $A_{15}$ | $A_{16}$ | $B_{11}$ | $B_{12}$ | $B_{15}$ | $B_{16}$ |
| 5 | $C_1$ | $C_2$ | $C_5$ | $C_6$ | $D_1$ | $D_2$ | $D_5$ | $D_6$ |
| 6 | $C_3$ | $C_4$ | $C_7$ | $C_8$ | $D_3$ | $D_4$ | $D_7$ | $D_8$ |
| 7 | $C_9$ | $C_{10}$ | $C_{13}$ | $C_{14}$ | $D_9$ | $D_{10}$ | $D_{13}$ | $D_{14}$ |
| 8 | $C_{11}$ | $C_{12}$ | $C_{15}$ | $C_{16}$ | $D_{11}$ | $D_{12}$ | $D_{15}$ | $D_{16}$ |

FIG. 9

|   | 1 | 2 | 3 | 4 | 5 | 6 | 7 | 8 |
|---|---|---|---|---|---|---|---|---|
| 1 | $AA_1$ | $AA_2$ | $BB_1$ | $BB_2$ | $B_1$ | $B_2$ | $B_5$ | $B_6$ |
| 2 | $AA_3$ | $AA_4$ | $BB_3$ | $BB_4$ | $B_3$ | $B_4$ | $B_7$ | $B_8$ |
| 3 | $A_9$ | $A_{10}$ | $A_{13}$ | $A_{14}$ | $B_9$ | $B_{10}$ | $B_{13}$ | $B_{14}$ |
| 4 | $A_{11}$ | $A_{12}$ | $A_{15}$ | $A_{16}$ | $B_{11}$ | $B_{12}$ | $B_{15}$ | $B_{16}$ |
| 5 | $C_1$ | $C_2$ | $C_5$ | $C_6$ | $D_1$ | $D_2$ | $D_5$ | $D_6$ |
| 6 | $C_3$ | $C_4$ | $C_7$ | $C_8$ | $D_3$ | $D_4$ | $D_7$ | $D_8$ |
| 7 | $C_9$ | $C_{10}$ | $C_{13}$ | $C_{14}$ | $D_9$ | $D_{10}$ | $D_{13}$ | $D_{14}$ |
| 8 | $C_{11}$ | $C_{12}$ | $C_{15}$ | $C_{16}$ | $D_{11}$ | $D_{12}$ | $D_{15}$ | $D_{16}$ |

FIG. 10

|   | 1 | 2 | 3 | 4 | 5 | 6 | 7 | 8 |
|---|---|---|---|---|---|---|---|---|
| 1 | AAA | BBB | $BB_1$ | $BB_2$ | $B_1$ | $B_2$ | $B_5$ | $B_6$ |
| 2 | CCC | DDD | $BB_3$ | $BB_4$ | $B_3$ | $B_4$ | $B_7$ | $B_8$ |
| 3 | $CC_1$ | $CC_2$ | $DD_1$ | $DD_2$ | $B_9$ | $B_{10}$ | $B_{13}$ | $B_{14}$ |
| 4 | $CC_3$ | $CC_4$ | $DD_3$ | $DD_4$ | $B_{11}$ | $B_{12}$ | $B_{15}$ | $B_{16}$ |
| 5 | $C_1$ | $C_2$ | $C_5$ | $C_6$ | $D_1$ | $D_2$ | $D_5$ | $D_6$ |
| 6 | $C_3$ | $C_4$ | $C_7$ | $C_8$ | $D_3$ | $D_4$ | $D_7$ | $D_8$ |
| 7 | $C_9$ | $C_{10}$ | $C_{13}$ | $C_{14}$ | $D_9$ | $D_{10}$ | $D_{13}$ | $D_{14}$ |
| 8 | $C_{11}$ | $C_{12}$ | $C_{15}$ | $C_{16}$ | $D_{11}$ | $D_{12}$ | $D_{15}$ | $D_{16}$ |

*FIG. 11*

| 1 | 2 | 5 | 6 | 17 | 18 | 21 | 22 |
|---|---|---|---|----|----|----|----|
| 3 | 4 | 7 | 8 | 19 | 20 | 23 | 24 |
| 9 | 10 | 13 | 14 | 25 | 26 | 29 | 30 |
| 11 | 12 | 15 | 16 | 27 | 28 | 31 | 32 |
| 33 | 34 | 37 | 38 | 49 | 50 | 53 | 54 |
| 35 | 36 | 39 | 40 | 51 | 52 | 55 | 56 |
| 41 | 42 | 45 | 46 | 57 | 58 | 61 | 62 |
| 43 | 44 | 47 | 48 | 59 | 60 | 63 | 64 |

*FIG. 13*

| 61 | 62 | 13 | 28 | 1 | 4 | 16 | 19 |
|----|----|----|----|---|---|----|----|
| 63 | 64 | 43 | 58 | 7 | 10 | 22 | 25 |
| 14 | 29 | 15 | 30 | 31 | 34 | 46 | 49 |
| 44 | 59 | 45 | 60 | 37 | 40 | 52 | 55 |
| 2 | 5 | 17 | 20 | 3 | 6 | 18 | 21 |
| 8 | 11 | 23 | 26 | 9 | 12 | 24 | 27 |
| 32 | 35 | 47 | 50 | 33 | 36 | 48 | 51 |
| 38 | 41 | 53 | 56 | 39 | 42 | 54 | 57 |

*FIG. 14*

|   | 1 | 2 | 3 | 4 | 5 | 6 | 7 | 8 |
|---|---|---|---|---|---|---|---|---|
| 1 | 13 | 26 | 52 | 52 | 104 | 104 | 104 | 104 |
| 2 | 26 | 26 | 52 | 52 | 104 | 104 | 104 | 104 |
| 3 | 52 | 52 | 52 | 52 | 104 | 104 | 104 | 104 |
| 4 | 52 | 52 | 52 | 52 | 104 | 104 | 104 | 104 |
| 5 | 104 | 104 | 104 | 104 | 104 | 104 | 104 | 104 |
| 6 | 104 | 104 | 104 | 104 | 104 | 104 | 104 | 104 |
| 7 | 104 | 104 | 104 | 104 | 104 | 104 | 104 | 104 |
| 8 | 104 | 104 | 104 | 104 | 104 | 104 | 104 | 104 |

|   | 1 | 2 | 3 | 4 | 5 | 6 | 7 | 8 |
|---|---|---|---|---|---|---|---|---|
| 1 | 1 | 2 | 5 | 6 | 17 | 18 | 21 | 22 |
| 2 | 3 | 4 | 7 | 8 | 19 | 20 | 23 | 24 |
| 3 | 9 | 10 | 13 | 14 | 25 | 26 | 29 | 30 |
| 4 | 11 | 12 | 15 | 16 | 27 | 28 | 31 | 32 |
| 5 | 33 | 34 | 37 | 38 | 49 | 50 | 53 | 54 |
| 6 | 35 | 36 | 39 | 40 | 51 | 52 | 55 | 56 |
| 7 | 41 | 42 | 45 | 46 | 57 | 58 | 61 | 62 |
| 8 | 43 | 44 | 47 | 48 | 59 | 60 | 63 | 64 |

FIG. 18

| 4 | 3 | 52 | 37 | 64 | 61 | 49 | 46 |
|---|---|---|---|---|---|---|---|
| 2 | 1 | 22 | 7 | 58 | 55 | 43 | 40 |
| 51 | 36 | 50 | 35 | 34 | 31 | 19 | 16 |
| 21 | 6 | 20 | 5 | 28 | 25 | 13 | 10 |
| 63 | 60 | 48 | 45 | 62 | 59 | 47 | 44 |
| 57 | 54 | 42 | 39 | 56 | 53 | 41 | 38 |
| 33 | 30 | 18 | 15 | 32 | 29 | 17 | 14 |
| 27 | 24 | 12 | 9 | 26 | 23 | 11 | 8 |

*FIG. 20*

| 64 | 63 | 60 | 59 | 48 | 47 | 44 | 43 |
|---|---|---|---|---|---|---|---|
| 62 | 61 | 58 | 57 | 46 | 45 | 42 | 41 |
| 56 | 55 | 52 | 51 | 40 | 39 | 36 | 35 |
| 54 | 53 | 50 | 49 | 38 | 37 | 34 | 33 |
| 32 | 31 | 28 | 27 | 16 | 15 | 12 | 11 |
| 30 | 29 | 26 | 25 | 14 | 13 | 10 | 9 |
| 24 | 23 | 20 | 19 | 8 | 7 | 4 | 3 |
| 22 | 21 | 18 | 17 | 6 | 5 | 2 | 1 |

*FIG. 21*

METHOD AND APPARATUS FOR HIGH SPEED HAAR TRANSFORMS

BACKGROUND OF THE INVENTION

1. Field of Invention

This invention relates to performing Haar transforms of image data.

2. Description of Related Art

Image processing is used in many different types of devices such as computers, digital cameras and digital television for displaying and storing image data. After images are captured and converted into image data, the image data are usually stored, transmitted or displayed. Because uncompressed image data consumes large amounts of storage and requires large bandwidths for transmission, various compression techniques have been applied to reduce the volume of data and, thus, reduce memory and bandwidth requirements as well as the amount of time to handle the image data.

Conventional image compression methods uses Joint Photographic Experts Group (JPEG) algorithms. Thus, image compression devices using JPEG algorithms are readily available. However, image processing devices are achieving ever higher resolutions and image delivery rates resulting in a demand for image compression performance that exceeds image compression capability achieved by conventional devices. Accordingly, new image compression technology is required to provide greater image compression performance.

SUMMARY OF THE INVENTION

This invention provides a method and apparatus for performing Haar transforms that processes one image pixel for each clock cycle. The Haar transform is performed by cascading successive Haar transforms cells where each Haar transform cell processes a 2×2 block of input values and outputs a 2×2 block of Haar transform coefficients.

The four input values are processed by a first stage of two adders and two subtractors and a second stage of two adders and two subtractors. A first adder of the first stage generates a sum of a first row of two input values of a first row of the 2×2 block and a second adder generates a sum of two input values of a second row of the 2×2 block. A first subtractor of the first stage generates a difference between the two input values of the first row of the 2×2 block and a second subtractor generates a difference between the two input values of the second row of the 2×2 block.

A first adder of the second stage sums the output of the first and second adders of the first stage to generate a low frequency coefficient of the Haar transform. A second adder of the second stage generates a sum of the outputs of the subtractors of the first stage to produce a third coefficient of the Haar transform. A first subtractor of the second stage generates a difference of the results of the adders of the first stage to generate a second coefficient of the Haar transform. A second subcontractor of the second stage generates a difference of the outputs of the first and second subtractors of the first stage to generate a fourth coefficient of the Haar transform.

The output coefficient of the Haar transform may be quantized, run length encoded and then compressed to achieve a high compression ratio of greater than 20 to 1 for near lossless image compression. The above Haar transform cell may be incorporated into any type of image capture, processing and reproduction devices such as cameras, scanners and printers to achieve high speed image data compression to reduce storage and bandwidth requirements.

BRIEF DESCRIPTION OF THE DRAWINGS

The invention is described in connection with the following figures wherein like numerals reference like elements, and wherein:

FIG. 9 shows the output of the first level Haar transform;

FIG. 10 shows an output of a second level Haar transform;

FIG. 11 shows an output of a third level Haar transform;

FIGS. 13 and 14 show a scanning order and an output order of the first, second and third level Haar transforms;

FIG. 17 shows quantization values corresponding to each of the three level Haar transform outputs;

FIG. 18 shows a scanning order for run length encoding;

FIGS. 20 and 21 show a scanning order and an output order of the inverse Haar transform.

DETAILED DESCRIPTION OF PREFERRED EMBODIMENTS

Figure 1:
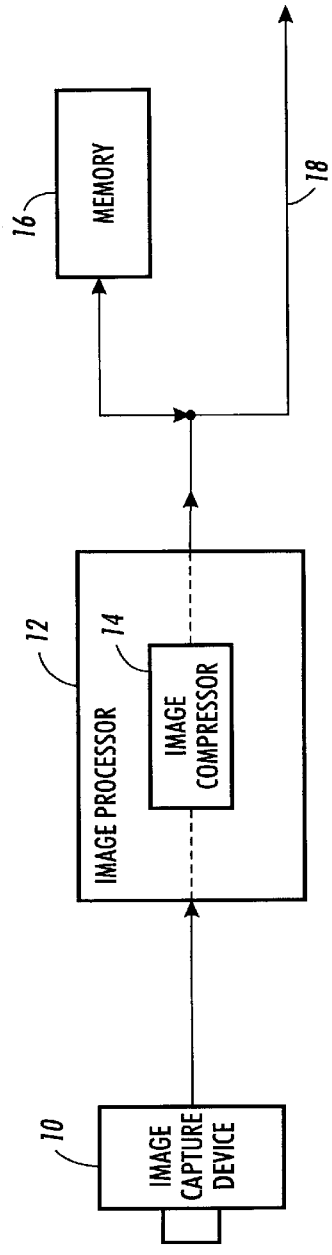
FIG. 1 shows and example of an process having an image compressor.
Figure 2:
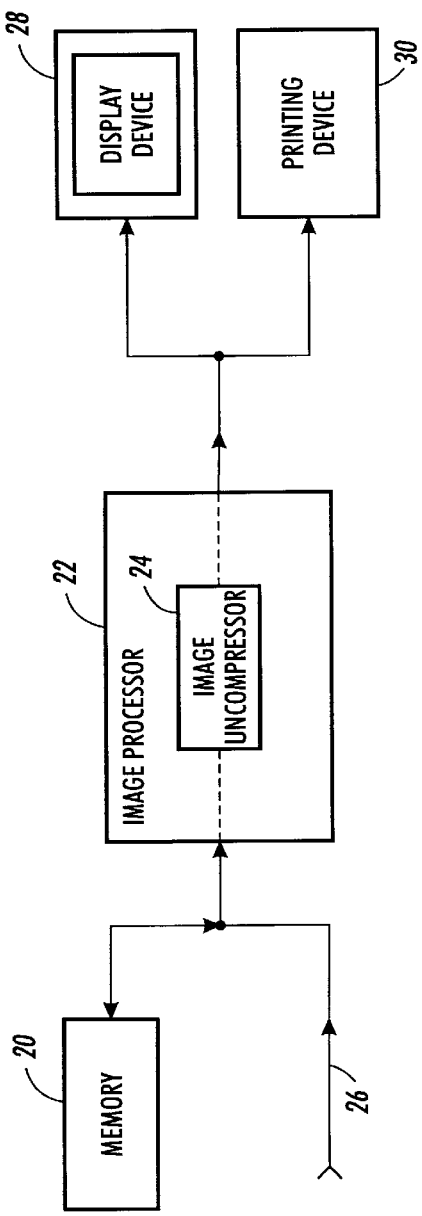
FIG. 2 shows an example of an image process having an image uncompressor.

FIGS. 1 and 2 shows examples of where image compression and uncompression may be used. In FIG. 1, an image capture device 10, such as a CCD of a digital camera, captures an image, converts the image into image data, and sends the image data to an image processor 12. The image data may either be gray scale data or color data having data corresponding to separate colors such as cyan (C), magenta (M), yellow (Y) and black (K). The image processor 12 performs preprocessing of the image data and then compresses the data through an image compressor 14 before outputting the compressed data to be stored in a memory 16 or transmitted to other devices via signal bus 18.

FIG. 2 shows an image processing that complements the processing shown in FIG. 1 where compressed image data may be received through a signal bus 26 and stored in a memory 20. The compressed data may be retrieved from the memory 20 by an image processor 22 or received directly from the signal bus 26 and the data is uncompressed through an image uncompressor 24, processed and output to image reproduction devices such as a display device 28 or a printing device 30. The image compressor 14 and image uncompressor 24 permits the image data to be stored and transmitted in a form that reduces the amount of memory required for the memory 16, 20 and/or bandwidth of the signal buses 18, 26.

As shown in FIGS. 1 and 2, the image compressor/uncompressor 14, 24 is in the image processing path of the image processor either receiving image data from the image capture device 10 or outputting the image data to the display device 28 or the printing device 30. Thus, the performance of the image compressor 14, 24 is critical to image processing. When the performance of the image capture device 10, the display device 28 and/or the printing device 30 is increased in terms of resolution and speed, the performance of the image compressor/uncompressor 14, 24 must correspondingly increase to maintain system performance. The preferred embodiments described below provide new technology for implementing the image compressor/uncompressor 14, 24 to achieve greatly improve performance over conventional techniques.

Figure 3:
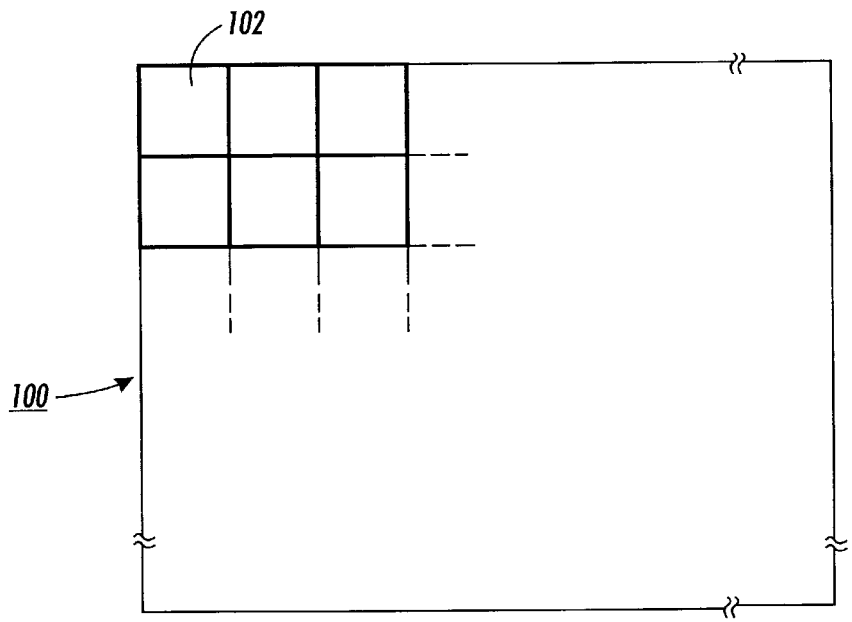
FIG. 3 shows image data divided into blocks.

FIG. 3 shows a diagram of image data 100 of an image (captured by the image capture device 10, for example) that is divided into blocks 102. As discussed above, when the image data 100 is stored in memory or transmitted from one device to another, the image data 100 may be compressed to reduce storage size or transmission bandwidth. Such data compression may be achieved by various transforms. For example, the Joint Photographic Experts Group (JPEG) transform is commonly used for this purpose.

The JPEG transform operates on the image data 100 in terms of the blocks 102. Each block 102 is processed independently of other blocks 102. Thus, once the image data 100 is divided into a set of contiguous blocks 102 such as shown in FIG. 3, each block 102 may be transformed separately to generate a transform output.

The Haar transform is another transform that also processes the image data 100 in terms of the blocks 102. Due to simplicity, the Haar transform is superior to the JPEG transform especially for high resolution images and lends itself to efficient hardware implementation permitting high speed image compression/uncompression. The preferred embodiments of the present invention provide a hardware implementation of the Haar transform that is capable of processing one pixel for each clock cycle thus achieving high image data processing speeds of up to 100 Mpixels/s using available Application Specific Integrated Circuits (ASICs) and Field Programmable Gate Arrays (FPGAs).

Figure 4:
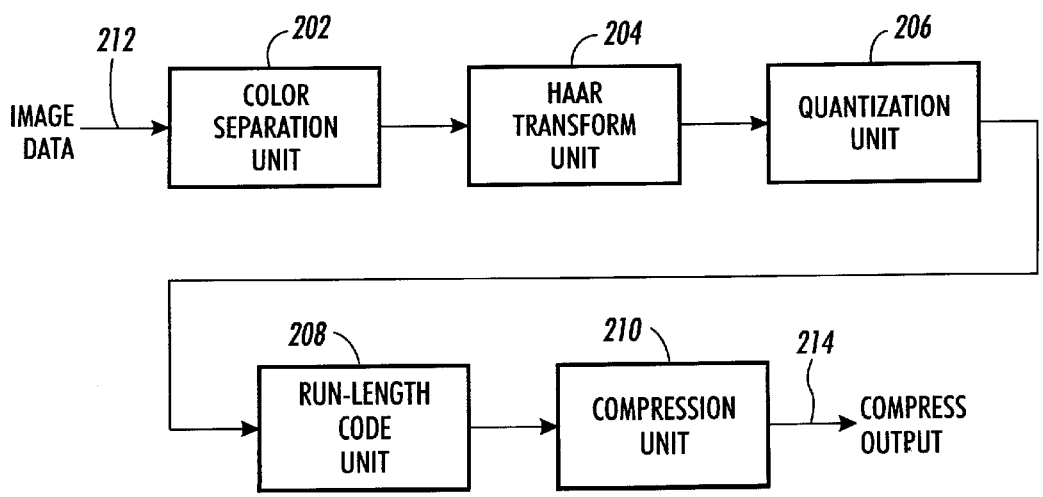
FIG. 4 shows a block diagram of an image processing process.

FIG. 4 shows a general process flow for data compression using the Haar transform. For color images, the image data 100 is first color separated by a color separation unit 202 that receives the image data through a signal bus 212. The color separation unit 202 typically separates the image data into four colors: cyan, magenta, yellow and black. Each of these colors are represented by a value such as 8 bits or a byte, for example. Thus, the image data 100 is separated into four portions where each portion represents one color. Each of the portions of the image data 100 is input to the Haar transform unit 204 that transforms a portion of the image data 100 into Haar transform coefficients. The Haar transform coefficients are then quantized by a quantization unit 206 and the output of the quantization unit 206 is encoded by a run length code unit 208, for example. The output of the run length code unit 208 is then compressed by a compression unit 210 and the output of the compression unit is output through a signal bus 214 to be either stored or transmitted. Gray scale data may be similarly processed as an image having only one color portion. For the discussion below, the image data 100 refers to a single portion of a full color image, or one gray scale image.

Figure 5:
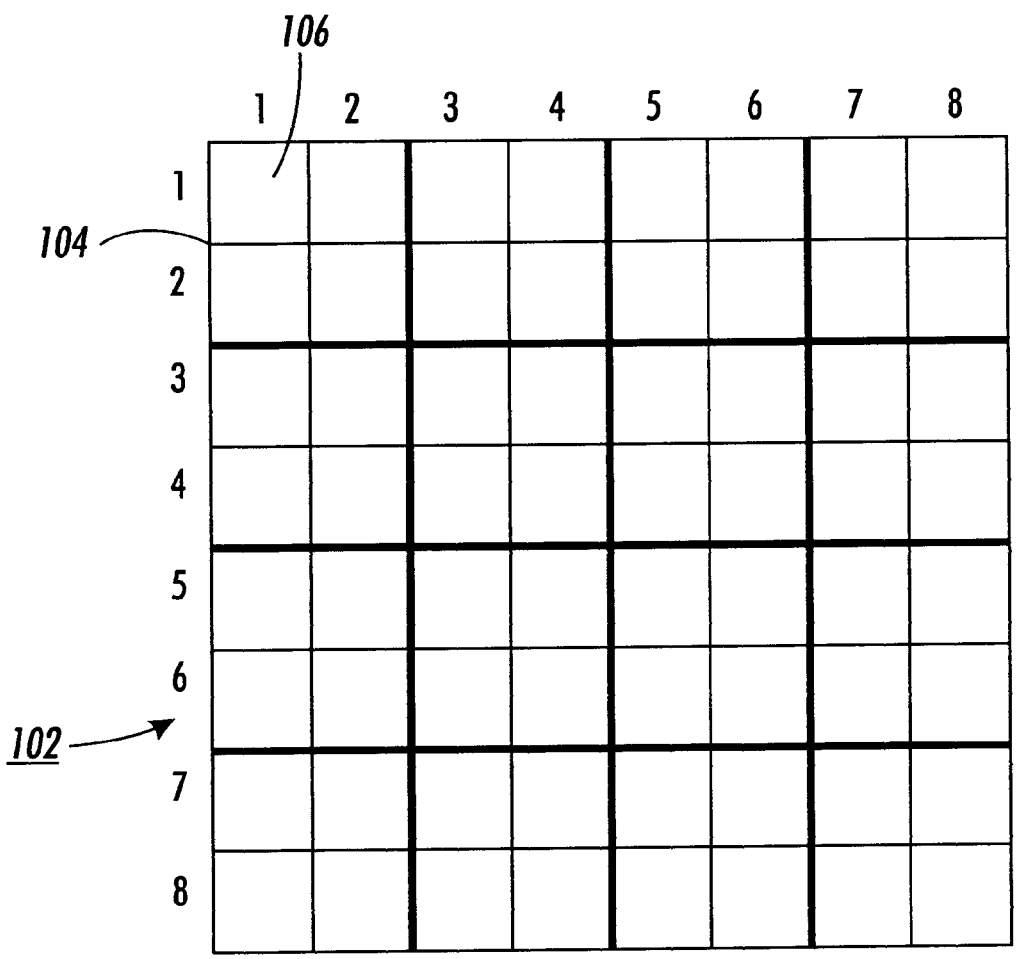
FIG. 5 shows an 8×8 pixel block divided into sixteen 2×2 sub-blocks.

As discussed earlier, the Haar transform processes the image data 100 in blocks 102. For example, FIG. 5 shows the block 102 as an 8×8 pixel block having 64 pixels. The block 102 is further divided into sixteen 2×2 sub-blocks 104 where each sub-block has four pixels 106.

Figure 6:
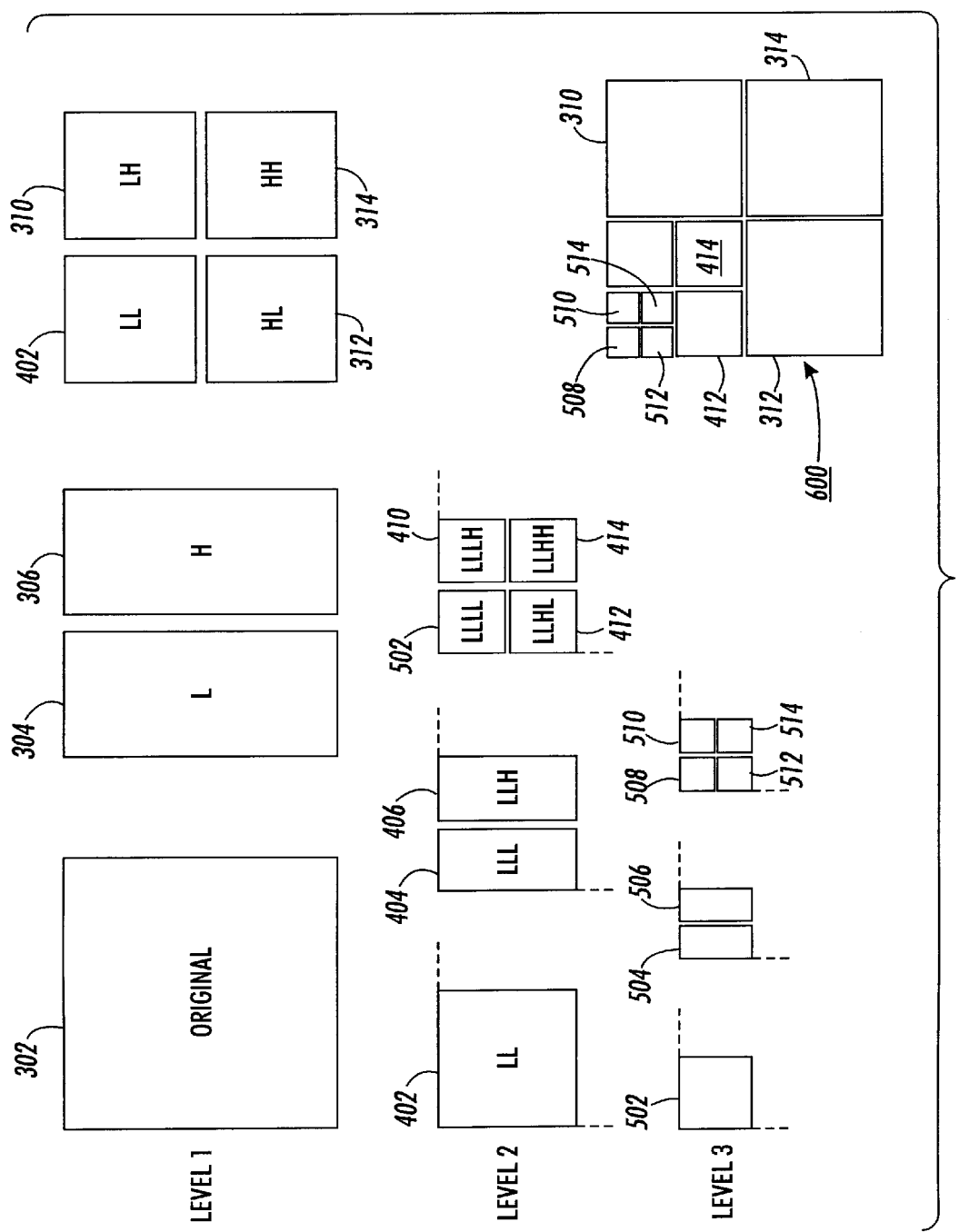
FIG. 6 shows three levels of Haar transform processing.

FIG. 6 shows the Haar transform process applied in three levels for a single block 102. In the top row labeled level one, one block 302 of the original image data pixels is processed in a first step by generating Haar transform coefficients corresponding to low frequencies and high frequencies along the horizontal direction forming the two columns 304 and 306 of Haar transform coefficients. Then, in a second step, each of the low and high frequency coefficients 304 and 306 are further transformed in the vertical direction forming four quadrants 402, 312, 314 and 310 of Haar transform coefficients. Each of the quadrants contain sixteen coefficients arranged in a 4×4 block. The quadrant 402 contains low frequency coefficients, quadrants 310 and 312 contain intermediate frequency coefficients, and quadrant 314 contains high frequency coefficients.

The level two Haar transform is applied to the low frequency quadrant 402 in a manner similar to the Haar transform for level one. The low frequency quadrant 402 is Haar transformed horizontally in a first step into two columns of level two coefficients 404 and 406. Then, in a second step, the level two coefficients 402 and 406 are transformed vertically forming four quadrants of level two coefficients 502, 412, 414 and 410. Each of the level two quadrants 502, 412, 414 and 410 contain four coefficients where each quadrant is a 2×2 block. Similar to the level one low frequency block 402, the level two block 502 contains the low frequency coefficients.

The level three Haar transform is applied to the level two low frequency block 502. Similar to the Haar transform for the level one and the level two, the level three Haar transform first generates low and high frequency coefficients 504 and 506 in a first step and then generating coefficients 508, 512, 514 and 510, in a second step. The level one-level three coefficients are arranged in an 8×8 block 600 as shown at the bottom right corner of FIG. 6. The level one intermediate and high frequency coefficients are placed in three 4×4 coefficient blocks 310, 312 and 314; the level two intermediate and high frequency coefficients are placed in three 2×2 coefficient blocks 410, 412 and 414; and finally, the level three coefficients 508, 512, 514 and 510 are placed at the upper left corner of the 8×8 coefficient block 600.

While the above example shows three levels of Haar transform, any number of levels of the Haar transform may be used. For example, a four level Haar transform would be applied to a 16×16 block of original image data and processed four times similar to the process shown in FIG. 4.

The Haar transform may be represented by the following equation expressed in terms of a Haar matrix:

$$H = \frac{1}{\sqrt{2}} \begin{pmatrix} 1 & 1 \\ 1 & -1 \end{pmatrix} \quad (1)$$

Where the $1/\sqrt{2}$ is a normalization factor.

Figure 7:
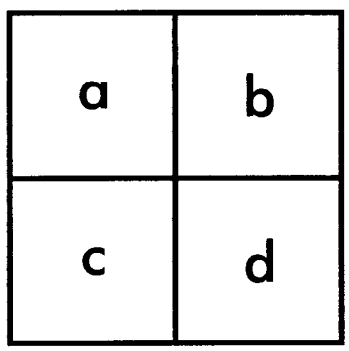
FIG. 7 shows a preferred input block scanning order for the Haar transform.

As can be seen from equation (1), the Haar transform is applied to a 2×2 block of inputs generating a 2×2 block of output Haar coefficients. For example, FIG. 7 shows a block of four image pixels (or Haar coefficients) a, b, c and d. These image pixels may be represented as a matrix such as:

$$\begin{pmatrix} a & b \\ c & d \end{pmatrix}.$$

To apply the first step of the level one Haar transform, the matrix of input image pixel (or coefficients for other levels) is multiplied by the Haar matrix as shown in equation (2) below:

$$\begin{pmatrix} a & b \\ c & d \end{pmatrix} \times \frac{1}{\sqrt{2}} \begin{pmatrix} 1 & 1 \\ 1 & -1 \end{pmatrix} = \frac{1}{\sqrt{2}} \begin{pmatrix} a+b & a-b \\ c+d & c-d \end{pmatrix} \quad (2)$$

The left side of the result matrix is the sum of the image pixels (or coefficients) of each row and the right side of the matrix is the difference of the image pixels of each row corresponding to the low and high frequencies portions 304 and 306 as shown in FIG. 6 for level one. The output of the first matrix multiplication is transposed and multiplied by the Haar matrix again to generate the Haar transform coefficients corresponding to the second step of the level one Haar transform as shown in FIG. 6. The second step is shown in equation (3) below:

$$\frac{1}{\sqrt{2}} \begin{pmatrix} a+b & c+d \\ a-b & c-d \end{pmatrix} \times \frac{1}{\sqrt{2}} \begin{pmatrix} 1 & 1 \\ 1 & -1 \end{pmatrix} = \quad (3)$$

$$\frac{1}{2} \begin{pmatrix} (a+b)+(c+d) & (a+b)-(c+d) \\ (a-b)+(c-d) & (a-b)-(c-d) \end{pmatrix}$$

The result of the second step of the level one Haar transform is the low frequency coefficient that is the sum of all the image pixels a+b+c+d; the intermediate frequency coefficients of (a+b)−(c+d) and (a−b)+(c−d); the high frequency coefficient (a−b)−(c−d), and the ½ which is the normalization factor.

Figure 8:
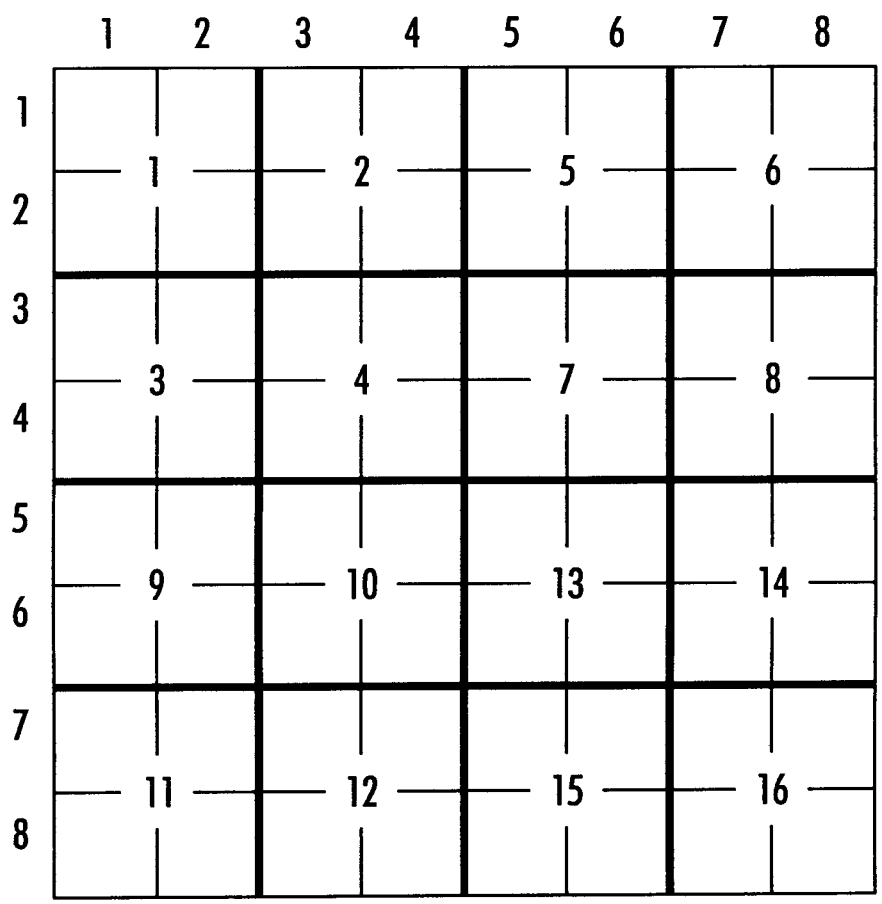
FIG. 8 shows a 2×2 sub-block.

As discussed above, the Haar transform is performed on a basic 2×2 block of inputs. Thus, the 8×8 block of the image data is first divided into sixteen 2×2 blocks as shown in FIG. 8. The level one Haar transform is performed on the 8×8 block by scanning the 2×2 blocks in the order shown in FIG. 8. If the result of the Haar transform for each 2×2 block is labeled A,B,C, and D where A is equal to (a+b)+(c+d); B is equal to (a+b)−(c+d); C is equal to (a−b)+(c−d); and D is equal to (a−b)−(c−d), then the result of the level one Haar transform when applied to the 8×8 block shown in FIG. 8 is shown in FIG. 9.

FIG. 9 shows the level one Haar transform results where A, B, C, and D have subscripts corresponding to the 2×2 blocks shown in FIG. 8. The output of the level one Haar transform is distributed in FIG. 9 so that all the low frequency coefficients are placed in the upper left quadrant between columns 1–4 and rows 1–4. The intermediate frequency coefficients are placed in the upper right quadrant and the lower left quadrant between columns 5–8 and rows 1–4, and columns 1–4 and rows 5–8. Finally, the high frequency coefficients are placed in the lower right quadrant between columns 5–8 and rows 5–8. When arranged in this manner, the upper left quadrant contains all the coefficients that are to be transformed by the level two Haar transform.

The level two Haar transform inputs the level one Haar transform coefficients to generate the level two Haar transform coefficients. For example, the first 2×2 block of level one Haar transform coefficients input to the level two Haar transform are $A_1$, $A_2$, $A_3$ and $A_4$ generating level two Haar transform coefficients $AA_1$, $BB_1$, $CC_1$ and $DD_1$. The second input 2×2 block of level one Haar transform coefficients is $A_5$, $A_6$, $A_7$ and $A_8$ generating level two Haar transform coefficients $AA_2$, $BB_2$, $CC_2$ and $DD_2$. The third input 2×2 block is $A_9$, $A_{10}$, $A_{11}$, and $A_{12}$ generating $AA_3$, $BB_3$, $CC_3$ and $DD_3$. Finally, the fourth input 2×2 block is $A_{13}$, $A_{14}$, $A_{15}$ and $A_{16}$ generating level two Haar transform coefficients $AA_4$, $BB_4$, $CC_4$ and $DD_4$.

The output of the level two Haar transform is shown in FIG. 10. As shown in FIG. 10, the level one Haar transform coefficients in columns 5–8 and rows 5–8 are untouched by the level two Haar transform. The level two Haar transform coefficients are placed in the upper left quadrant between columns 1–4 and rows 1–4 in a similar manner as the output of the level one Haar transform are placed in the 8×8 block. Thus, the level two low frequency Haar transform coefficients are placed in the upper left 2×2 block while the level two intermediate frequency Haar transform coefficients are placed in the upper right and the lower left 2×2 blocks and the level two high frequency Haar transform coefficients are placed in the lower right 2×2 block. The third level Haar transform is performed on the level two low frequency coefficients located in the upper left 2×2 block. The result of the third level Haar transform is shown in FIG. 11 where AAA, BBB, CCC and DDD represent the level three Haar transform coefficients.

The output of all three levels of the Haar transform shown in FIG. 11 may be divided into three portions 620, 622 and 624. Portion 620 contains the output of the level one Haar transform; the portion 622 contains the output of the level two Haar transform; and the portion 624 is the output of the level three Haar transform. Portion 626 contains the level three low frequency Haar transform coefficient.

Figure 12:
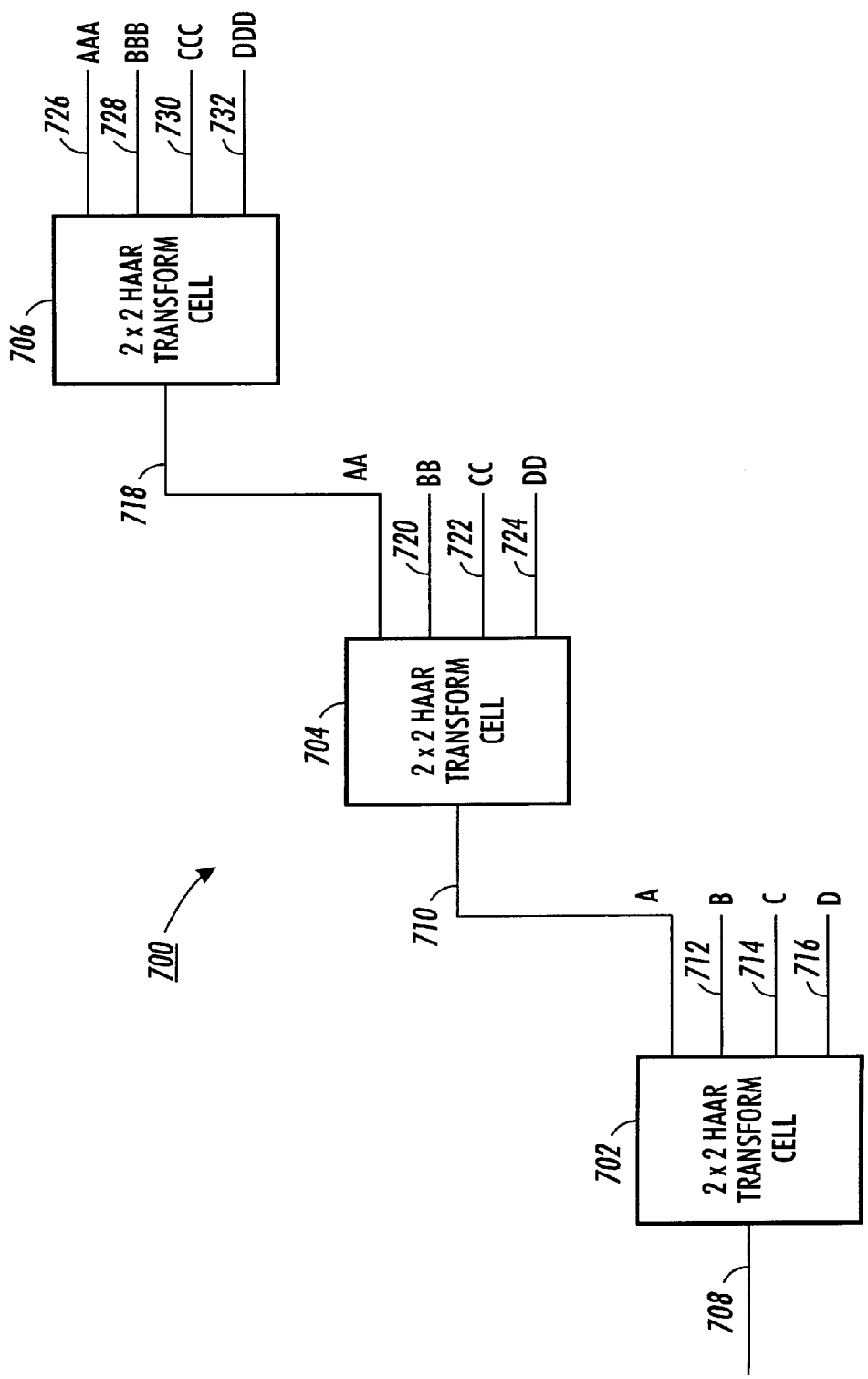
FIG. 12 shows a hardware block diagram for three 2×2 Haar transform cells that generates three levels of the Haar transform.

FIG. 12 shows a block diagram of a Haar transform device 700 that performs the three levels of Haar transform as described above. While FIG. 12 shows the Haar transform device 700 performing only level one, level two and level three of the Haar transform, the Haar transform device 700 may be easily extended to generate any number of levels of Haar transform coefficients. The Haar transform device 700 includes a first Haar transform cell 702, a second Haar transform cell 704 and a third Haar transform cell 706. The first Haar transform cell receives image data pixels in one 2×2 block at a time and generates the level one Haar transform coefficients A, B, C, and D on signal buses 710, 712, 714 and 716, respectively. The 2×2 image data pixels are scanned from each 8×8 image data pixel block as shown in FIG. 8.

After each of the 2×2 image data pixel blocks are transformed by the Haar transform cell 702, the Haar transform coefficient A is input to the second Haar transform cell 704 while the B, C and D level one Haar transform coefficients are placed in an output buffer (not shown) in locations as dictated by the output 8×8 Haar transform coefficient output block as shown in FIG. 11. The A Haar transform coefficient of the 2×2 Haar transform cell 702 is collected by the second Haar transform cell 704 corresponding to positions as shown in FIG. 9. Thus, for the 2×2 block 1 as shown in FIG. 8, the A coefficient is placed in the first column and first row corresponding to $A_1$. The A output of the 2×2 block 2 is placed in column 2, row 1 corresponding to $A_2$, and so on. Thus, after four 2×2 blocks 1, 2, 3, and 4, the output of the 2×2 Haar transform cell 702 generates the level one coefficients in rows 1–2, columns 1–2 and 5–6, and rows 5–6, columns 1–2 and 5–6 as shown in FIG. 9. At this point, the level two Haar transform cell 704 has four level one coefficients and performs the level two Haar transform to generate level two coefficients $AA_1$, $BB_1$, $CC_1$, and $DD_1$, placed in positions as shown in FIG. 10.

While the level two Haar transform cell 704 performs the above process, the level one Haar transform cell 702 proceeds to process the next four 2×2 image data pixel blocks 5, 6, 7 and 8 as shown in FIG. 8. Upon completion of the above level one Haar transform, level one coefficients $A_5$–$A_8$, $B_5$–$B_8$, $C_5$–$C_8$ and $D_5$–$D_8$ are generated. The level one coeffcients $A_5$–$A_8$ are output to the level two Haar transform cell 704 as they are generated. After the level one coefficient $A_8$ is generated, the level two Haar transform cell 204 may start to generate the level two coefficients $AA_2$, $BB_2$, $CC_2$ and $DD_2$ from $A_5$–$A_8$ as shown in FIG. 10. The above process continues until all the 2×2 image pixel data blocks 1–16 of FIG. 8 are processed by the level one Haar transform cell 702.

The low frequency level two coefficients are input into the level three Haar transform cell 706. Thus, after the level two Haar transform cell generates level two coefficients $AA_4$, $BB_4$, $CC_4$ and $DD_4$, the level three Haar transform cell 706 processes the level two coefficients $AA_1$, $AA_2$, $AA_3$ and $AA_4$ and generates AAA, BBB, CCC, and DDD.

Figure 15:
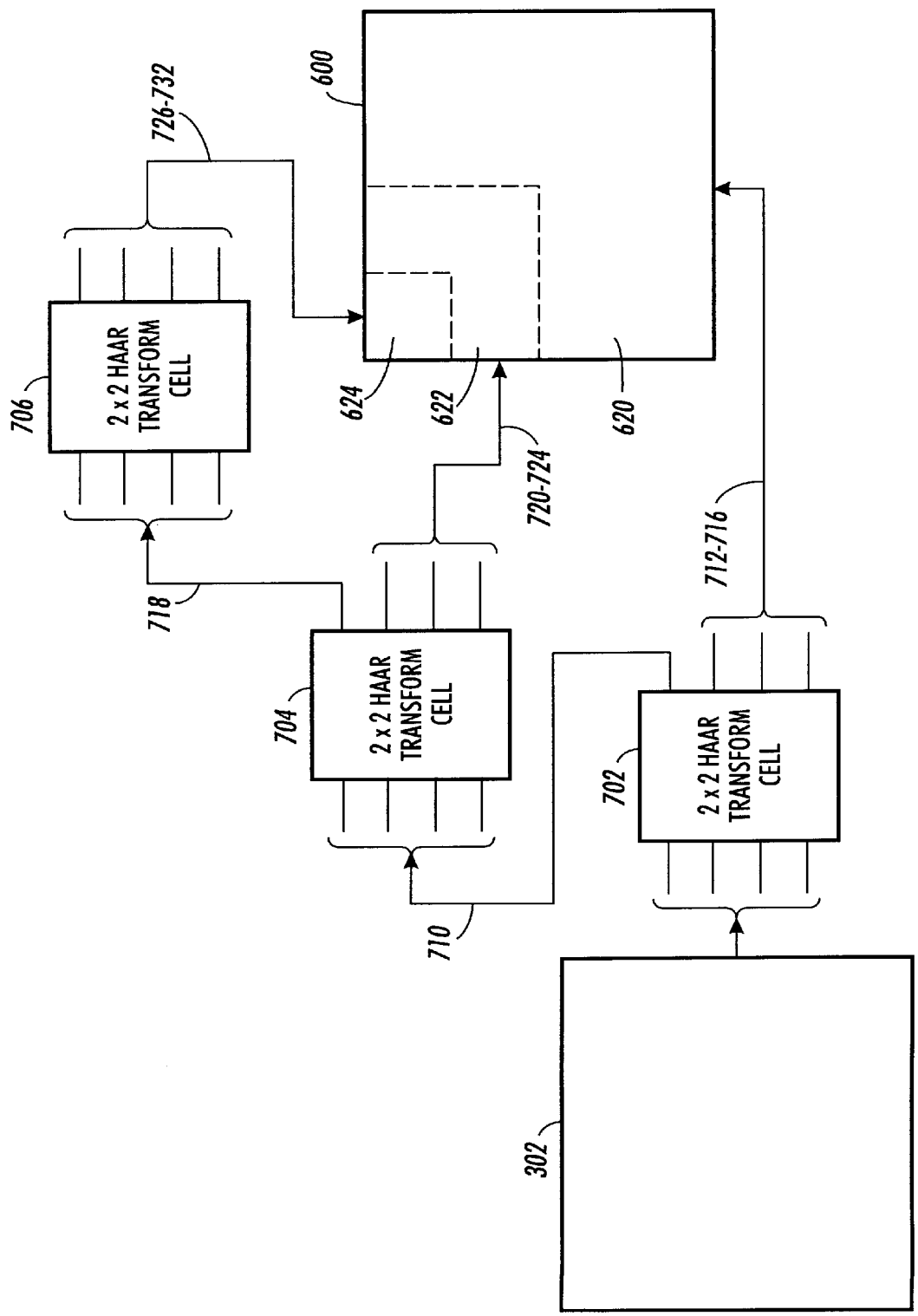
FIG. 15 shows Haar coefficient output positions in an output 8×8 block.

FIG. 13 shows the order in which the image pixel data are scanned from an 8×8 pixel block having 64 pixels. FIG. 14 shows the order in which the output of the 2×2 Haar transform cells 702–706 are placed in an output 8×8 Haar transform coefficient block. FIG. 15 shows the positions of the level 1, level 2, and level 3 coefficients 620–624 in the Haar transform output 8×8 block 600. As shown in FIG. 15, the level 1 Haar transform cell 702 receives image data pixels from an 8×8 input block 302 and outputs level one Haar coefficients into either the output 8×8 block 600 or to the level 2 2×2 Haar transform cell 704.

Figure 16:
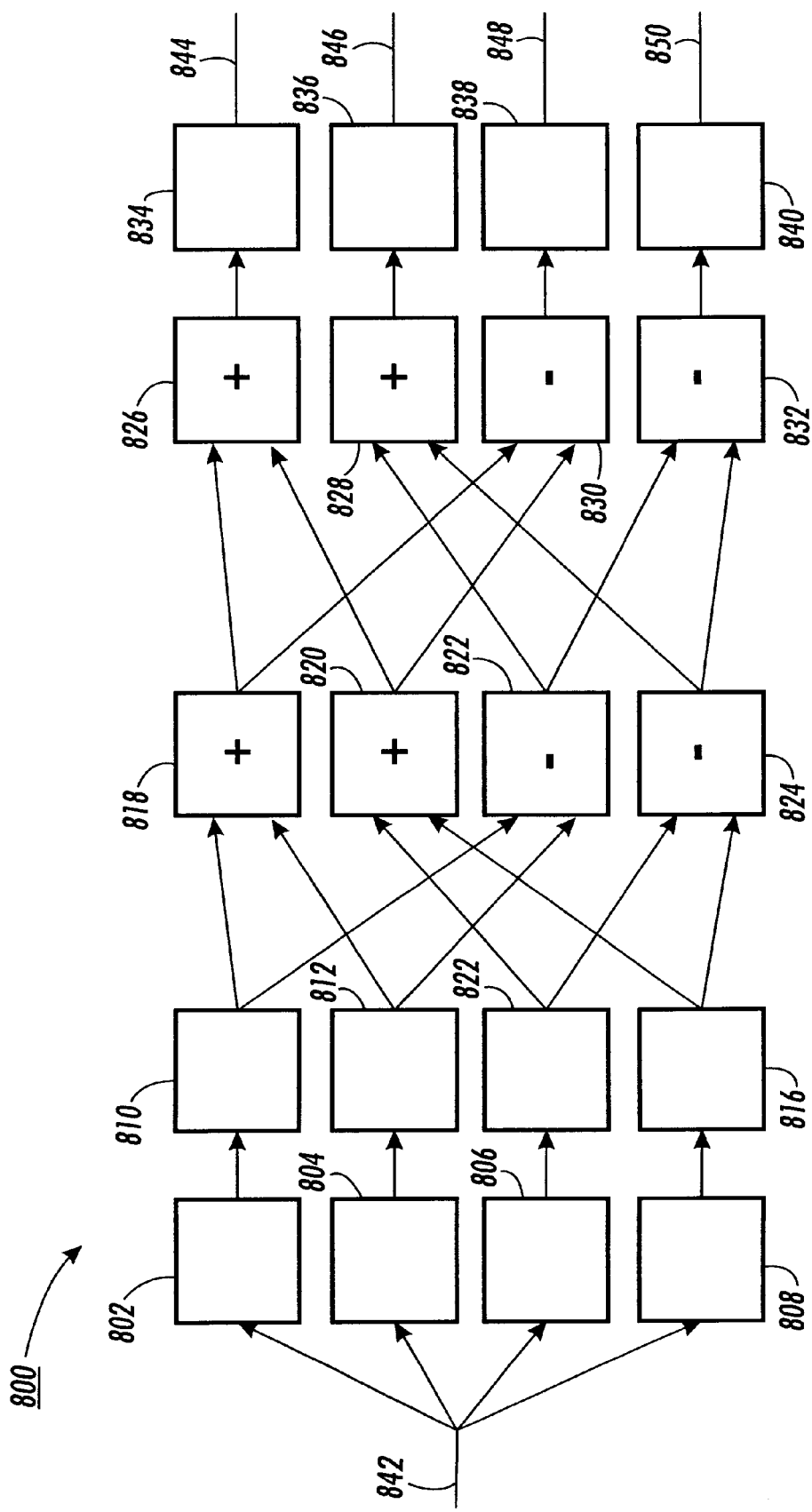
FIG. 16 shows a detailed block diagram of one of the 2×2 Haar transform cells shown in FIG. 12.

Each of the first-third 2×2 Haar transform cells 702–706 have the exact same hardware configuration as shown in FIG. 16. The generic 2×2 Haar transform cell 800 includes registers 802–816 and 834–840. The registers 802–808 store input data as the input data is input through the signal bus 842. If the input data are a, b, c and d as shown in FIG. 7, then the register 802 stores a; the register 804 stores b; the register 806 stores c and the register 808 stores d. After a, b, c and d are stored in the registers 802–808, the input data a, b, c, and d are transferred to the registers 810, 812, 814 and 816, respectively. After the input data is transferred from the registers 802–808 to the registers 810–816, the registers 802–808 may receive additional input data for the next 2×2 block while the input data stored in the registers 810–816 are being Haar transformed.

The input data contained in the registers 810–816 are processed by adders 818 and 820 and subtractors 822 and 824. The adder 818 adds the contents of the registers 810 and 812 while the adder 820 adds the contents of the registers 814 and 816 generating a+b and c+d, respectively, as shown in equation (2). The subtractor 822 subtracts the content of 812 from the content of 810 and the subtractor 824 subtracts the content of 816 from the content of 814 generating a–b and c–d, respectively, as shown in equation (2). Thus, the adders and subtractors 818–824 perform the first stage of a Haar transform.

The adders and subtractors 826–832 perform the second stage of the Haar transform. The adder 826 adds the outputs of the adders 818 and 820 and the adder 828 adds the outputs of the subtractors 822 and 824 to generate the Haar transform coefficients A and C (for transform cell 702, for example), respectively. The subtractor 830 subtracts the output of the adder 820 from the output of the adder 818 and the subtractor 832 subtracts the output of the subtractor 824 from the output of the subtractor 822 to generate the Haar transform coefficients B and D, respectively. The outputs of the adders and subtractors 826–832 are stored in the registers 834–840 for output to either following levels of the Haar transform or to following processes as shown in FIG. 4.

The above described transform cells may be implemented in hardware or software. For a preferred hardware implementation, a 4000 series Xilinx FPLA may be used. The sizes of the adders and registers increases by two bits progressing from transform cell 702 to 704 to 706 to account for the scale factors involved. Thus, if the input image data are in bytes (eight bits) then the output registers have a size of ten bits and the next transform cell has input registers corresponding to registers 802–816 having ten bits and the adders and subtractors 818–824 has a size of ten bits and the output registers 834–840 would have a size of twelve bits, and so on. Using the above scheme, a Xilinx 4000 series array could implement the Haar transform device for three levels of Haar transform using about one-third of a XZ4025 FPLA that has 1024 configurable logic blocks.

The above Xilink 4000 can be clocked at 100 MHz. Thus, a Haar transform cell implemented using the Xilink 4000 may clock input pixels into the input registers 802–808 one input pixel per clock. Then, for every four clocks, the inputs are transferred to the registers 810–816. The adders and subtractors 818–824 have four clock cycles to settle. Thus, each of the Haar transform cell effectively processes one input pixel per clock cycle.

The normalization factor of ½ after each 2×2 Haar transform may be implemented by simply shifting the transform result by one bit to the right. This also may be performed by simply ignoring the least significant bit of the result resulting in a small loss of precision. This loss of precision is probably acceptable in most cases. The advantage of this is also a reduction in the size of the hardware because the word length decreases by one bit at the output of the first 2×2 Haar transform cell. A total reduction of about 38 configurable logic blocks can be achieved by implementing this normalization technique.

While the above example suggests using Xilinx FPLA, Application Specific Integrated Circuits (ASIC) or other technology may be used. The hardware obtained may be incorporated into digital cameras, printers, computers or any other equipment that performs image data compression or uncompression. In addition, the Haar transform hardware may be used to generate Haar transform coefficients for processing image data processing such as filtering and spectral analysis, for example.

After the Haar transform is performed, the Haar coefficients are quantized by a quantization process using coefficients 900 as shown in FIG. 17. If x represents a Haar coefficient, q represents a quantized Haar coefficient, and $Q_s$ represents a quantization coefficient value, then the quantization process may be represented by the equation (4) below:

$$\text{if } (x \geq 0) \quad q = \frac{1}{2}\left(\frac{2x}{Q_s} + 1\right) \text{ else } \frac{1}{2}\left(\frac{2x}{Q_s} - 1\right) \tag{4}$$

As shown in equation (4) above, the Haar coefficients have positive and negative values. Thus, if the Haar coefficient is greater than or equal to zero, then the quantized value is $$\frac{1}{2}\left(\frac{2x}{Q_s}+1\right).$$

If the Haar coefficient is less than zero then the quantization value is $$\frac{1}{2}\left(\frac{2x}{Q_s}-1\right).$$

TABLE 1

| input code | output code |
|---|---|
| −127 ... +127 | N |
| −32768 ... −128 | 0 × 80, 0 × 00, N, M |
| +128 ... +32768 | 0 × 80, 0 × 00, N, M |
| 0, ... , 0 | 0 × 80, C |

In the example process shown in FIG. 4, the output of the quantization unit 206 is encoded by a run length code unit. Table I above shows exemplary encoding values. For those quantized values that are between −127 and +127, the encoded value is simply the quantized value q. For those values that are less than 128 or greater than −32,768, the encoded value includes four bytes. The first byte has the hexadecimal value 0x80, the second byte has the hexadecimal value 0x00 and the third and fourth bytes are hexadecimal values representing the quantized value q. The same is true when the quantized value q is greater than 128 but less than 32,768. If two or more consecutive quantized values q are zeros, then the encoded value contains two bytes where the first byte has the hexadecimal value 0x80 and the second byte is a count of the number of zeros having a hexadecimal value between 0x02 to 0xFF.

The quantization coefficients Qs shown in FIG. 17 have been empirically tested to yield a largest number of consecutive zeros and yet produce a substantially visually lossless image after uncompression. The quantization values as shown in FIG. 4 correspond to the Haar coefficients as shown in FIG. 9. Thus, the quantization coefficients Qs used to quantize the Haar transform coefficient values corresponding to portion 620 have the value of 104; the quantization coefficients Qs corresponding to the portion 622 have the value of 52; the quantization coefficients Qs corresponding to the portion 624 have quantization value 26; and the quantization value corresponding to the Haar transform coefficient 626 is 13.

FIG. 18 shows the scan order for scanning the quantized Haar transform coefficients to obtain a maximum number of consecutive zeros. The quantized values in the 2×2 block in columns 1–2 and rows 1–2 and 3–4 are scanned horizontally while the 2×2 blocks in columns 1–2 and 3–4 are scanned vertically. The quantized values in the 4×4 blocks between columns 5–8 and rows 1–4 and 5–8 are scanned vertically while the quantized values in the 4×4 block in columns 1–4 and 5–8 are scanned horizontally.

As shown in FIG. 4, after the run length coding process 208, the resulting data is processed by a compression unit 210 which uses common compression algorithms for entropy coding such as the Lempel-Ziff, Huffman and Rx coding, for example. The compressed Haar transform coefficients are then transmitted to other processing devices or stored for future use.

Figure 19:
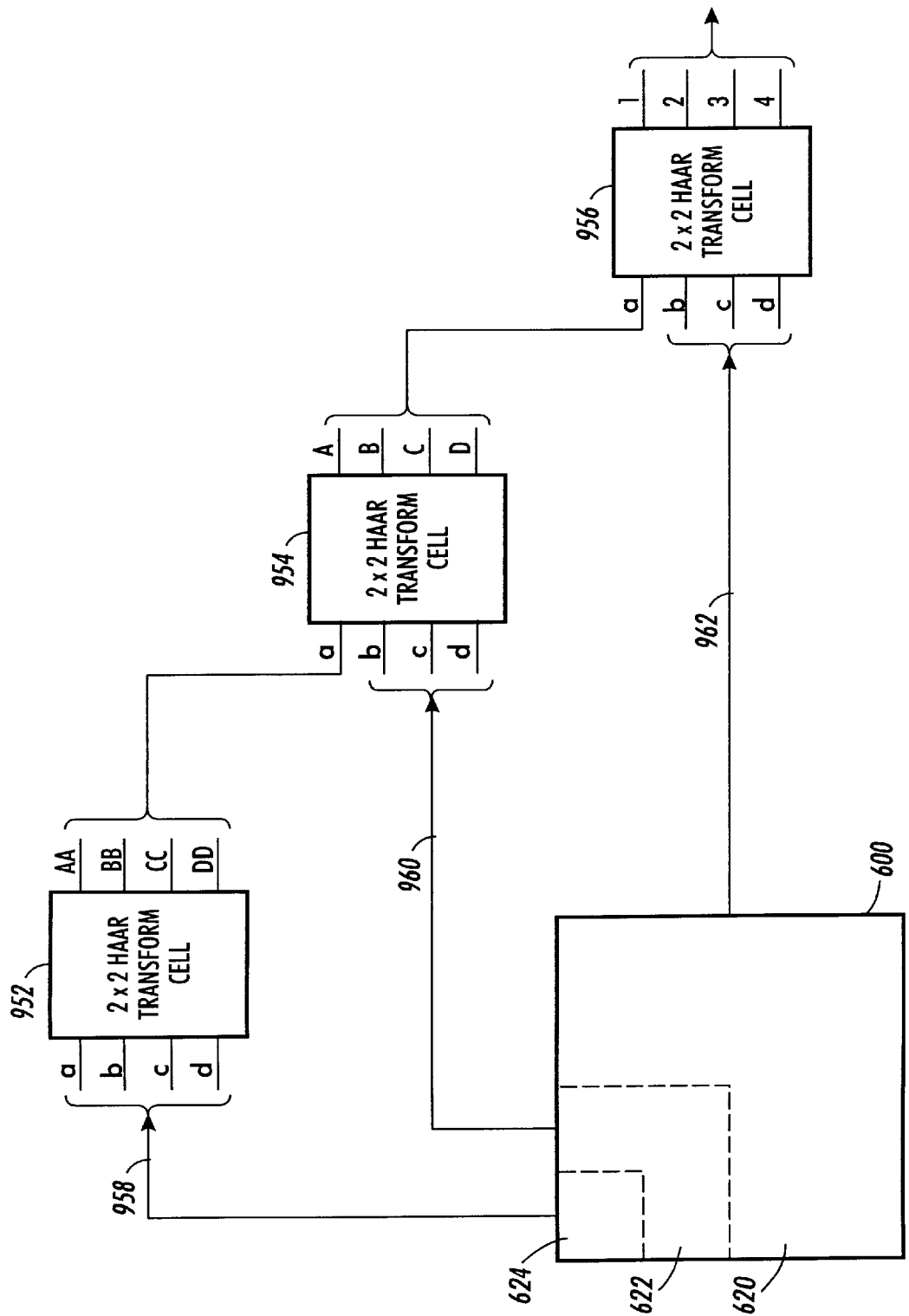
FIG. 19 shows a hardware block diagram for three 2×2 Haar transform cell for performing inverse Haar transforms.

When required, the compressed Haar transform coefficients may be uncompressed back to image data by performing the reverse of the compression, run length encoding and quantization processes. An inverse Haar transform may be performed using the same transform cells that performed the Haar transform (forward Haar transform) as shown in FIG. 16. FIG. 19 shows a block diagram of three transform cells 952, 954 and 956 that perform a three level inverse Haar transform. The transform cell 952 inverse Haar transforms the level three Haar transform coefficients 624 into level two Haar transform coefficients; the transform cell 954 inverse Haar transforms the level two Haar transform coefficients 622 and the level two coefficients generated by the transform cell 952 into the level one Haar transform coefficients; and the transform cell 956 inverse Haar transforms the level one Haar transform coefficients 620 and the level one coefficients generated by the transform cell 954 into image data pixels.

FIGS. 20 and 21 show the order in which the Haar transform coefficients are scanned to perform the inverse Haar transform and the output order into an output 8×8 image pixel data block. The transform cell 952 processes the level three Haar transform coefficients AAA, BBB, CCC, DDD from positions 1, 2, 3 and 4 as shown in FIG. 20. The generated level two Haar transform coefficients are then effectively placed back into the positions of the level three Haar transform coefficients as shown in FIG. 10. Then the transform cell 954 processes the level two Haar transform coefficients located between columns 1–4 and rows 1–4 to regenerate the level one Haar transform coefficients and places the level one Haar transform coefficients into positions effectively the same as shown in FIG. 9.

As noted earlier, the level two Haar transform coefficients were generated using 2×2 blocks formed by $A_1$–$A_{16}$ for example. In particular, $AA_4$, $BB_4$, $CC_4$ and $DD_4$ were generated using $A_4$, $A_8$, $A_{12}$ and $A_{16}$. Thus, after the transform cell 954 inverse transforms the first 2×2 Haar transform block $AA_4$, $BB_4$, $CC_4$ and $DD_4$ the level one Haar transform coefficients $A_4$, $A_8$, $A_{12}$ and $A_{16}$ are regenerated. At this point, the transform cell 956 may begin performing inverse Haar transform of the level one Haar transform coefficients into image data pixels starting with $A_{16}$, $B_{16}$, $C_{16}$ and $D_{16}$. Accordingly, the scanning order shown in FIG. 20 shows that $D_{16}$ is the eighth scanned Haar coefficient, $C_{16}$ is the ninth scanned coefficient and $B_{16}$ is the tenth scanned coefficient. The transform cell then generates image pixel data 1, 2, 3 and 4 as shown in FIG. 21. Progressing in this manner, the transform cell 954 and the transform cell 956 may operate in parallel to inverse transform the Haar transform coefficients into image data pixels.

While this invention has been described in conjunction with specific embodiments thereof, it is evident that many alternatives, modifications and variations will be apparent to those skilled in the art. Accordingly, preferred embodiments of the invention as set forth herein are intended to be illustrative not limiting. Various changes may be made without departing from the spirit and scope of the invention.

What is claimed is:

1. A Haar transform device, comprising:
    a first stage Haar transform unit that receives input values and generates first stage output values, wherein the first stage Haar transform unit includes:
    a first adder adding a and b generating a+b:
    a second adder adding c and d generating c+d;
    a first subtractor subtracting b from a generating a−b; and
    a second subtractor subtracting d from c generating c−d; and
    a second stage Haar transform unit coupled to the first stage Haar transform unit that receives the first stage output values and generates Haar transformed values, wherein the second stage Haar transform unit includes:

a third adder adding a+b and c+d generating A;

a fourth adder adding a−b and c−d generating C;

a third subtractor subtracting c+d from a+b generating B; and a fourth subtractor subtracting c−d from a−b generating D.

2. The device of claim 1, further comprising:

first input registers coupled to the first stage Haar transform unit that receive the input values; and output registers coupled to the second stage Haar transform unit that receive the Haar transformed values and outputs the Haar transformed values.

3. The device of claim 2, further comprising:

second input registers coupled to the first input registers, the first input registers receive the input values and transfer the input values to the second input registers.

4. The device of claim 3, wherein each of the first and the second registers stores a first input value a, a second input value b, a third input value c, and a fourth input value d and the output register stores a first Haar transformed value A, a second Haar transformed value B, a third Haar transformed value C, and a fourth Haar transformed value D.

5. An imaging processing device that includes the Haar transform device of claim 1, the image processing device being one of a printer, a scanner, a digital camera, a computer display processing unit, an image storage device, an image reproduction device and an image capture device.

6. The device of claim 4, wherein the Haar transform device is implemented using a Xilinx field programmable gate array.

7. The device of claim 6, wherein the Haar transform device is clocked at 100 MHz.

8. The device of claim 4, wherein output values of the first, the second, the third and the fourth adders have bit widths that are one bit wider than bit widths of values input into the first, the second, the third and the fourth adders, and the output register has a bit width that is one bit wider than the bit width of the output values of the third and fourth adders.

9. The device of claim 4, wherein least significant bits of outputs of the first, the second, the third and the fourth adders are dropped.

10. A Haar transform apparatus that includes at least two Haar transform devices of claim 1, wherein a first Haar transform device outputs low frequency Haar transform coefficients to a second Haar transform device, the second Haar transform device performing a next level of Haar transform based on received Haar transform coefficients as inputs.

11. A method for performing a Haar transform, comprising:

generating first stage Haar transform values based on received input values, wherein generating the first stage Haar transform values includes:

adding a and b in a first adder to generate a+b;

adding c and d in a second adder to generate c+d;

subtracting b from a in a first subtractor to generate a−b; and subtracting d from c in a second subtractor to generate c−d; and generating second stage Haar transform values based on the first stage Haar transform values wherein generating the second stage Haar transform values includes:

adding a+b and c+d in a third adder to generate A;

adding a−b and c−d in a fourth adder to generate C;

subtracting c+d from a+b in a third subtractor to generate B; and subtracting c−d from a−b in a fourth subtractor to generate D.

12. The method of claim 11, further comprising:

receiving the input values into first input register, the first input registers storing the input values for generating the first stage Haar transform values;

receiving the second stage Haar transform values in output registers; and outputting the second stage Haar transform values as results of the Haar transform.

13. The method of claim 12, further comprising:

receiving the input values in second input registers that is coupled to the first input registers;

storing the input values in the second input registers; and transferring the input values stored in the second input registers to the first input registers.

14. The method of claim 13, wherein each of the first and the second registers stores a first input value a, a second input value b, a third input value c, and a fourth input value d and the output register stores a first Haar transformed value A, a second Haar transformed value B, a third Haar transformed value C, and a fourth Haar transformed value D.

* * * * *